Figure 6:
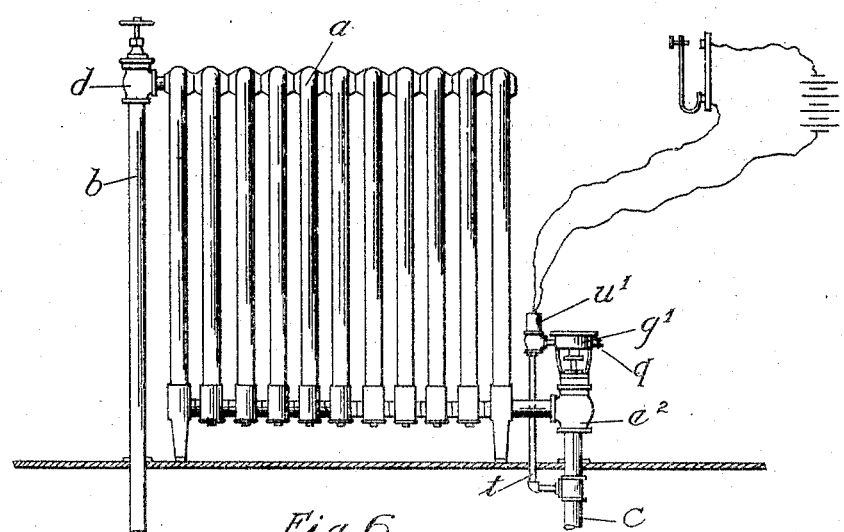

No. 776,783. PATENTED DEC. 6, 1904.
E. H. HUNTER.
TEMPERATURE REGULATING DEVICE.
APPLICATION FILED MAR. 1, 1904.
NO MODEL. 3 SHEETS—SHEET 1.
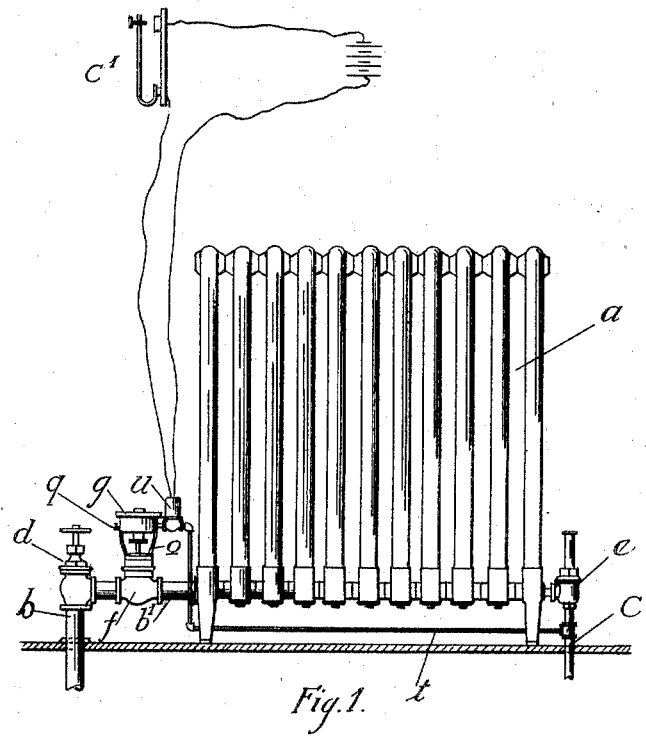
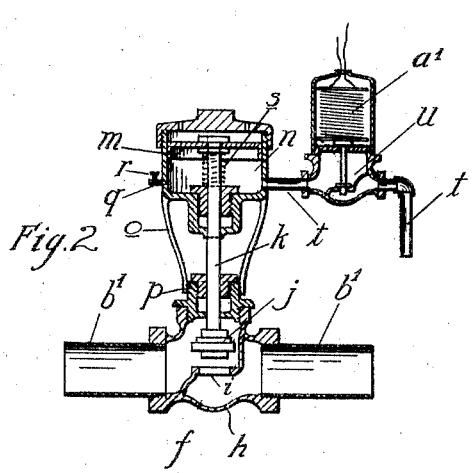
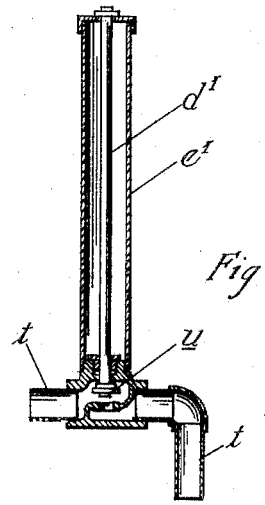
Witnesses
Inventor

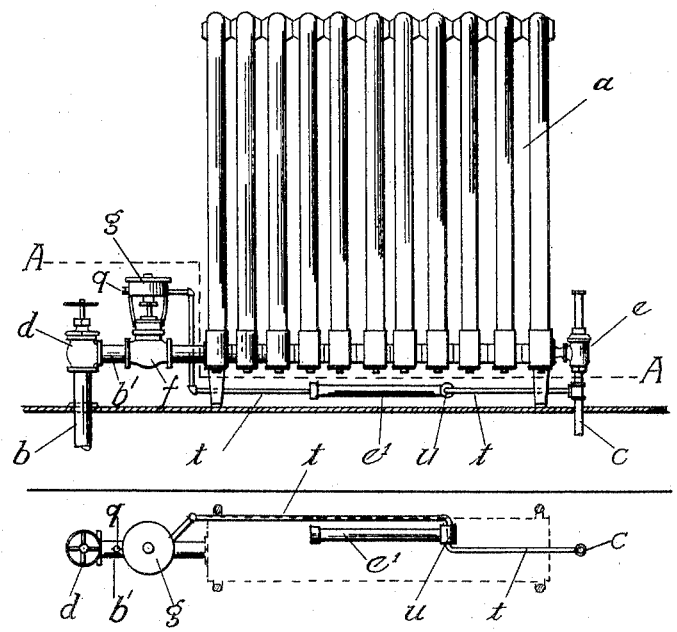

No. 776,783. PATENTED DEC. 6, 1904.
E. H. HUNTER.
TEMPERATURE REGULATING DEVICE.
APPLICATION FILED MAR. 1, 1904.
NO MODEL. 3 SHEETS—SHEET 3.

WITNESSES: INVENTOR:

No. 776,783. Patented December 6, 1904.

UNITED STATES PATENT OFFICE.

ERNEST HOWARD HUNTER, OF PHILADELPHIA, PENNSYLVANIA, ASSIGNOR TO WARREN WEBSTER AND COMPANY, OF CAMDEN, NEW JERSEY, A CORPORATION OF NEW JERSEY.

TEMPERATURE-REGULATING DEVICE.

SPECIFICATION forming part of Letters Patent No. 776,783, dated December 6, 1904.

Application filed March 1, 1904. Serial No. 196,047. (No model.)

*To all whom it may concern:*

Be it known that I, ERNEST HOWARD HUNTER, of the city and county of Philadelphia, State of Pennsylvania, have invented an Improvement in Temperature - Regulating Devices, of which the following is a specification.

In most temperature-regulating devices now employed in heating apparatus in which the regulation is effected by the opening and closing of valves or dampers through the operation of a pressure-motor the motor-actuating power, whether it be compressed air or suction, is obtained from a source otherwise independent of the heating system.

It is one of the objects of my invention to utilize for the purpose of operating the valve-controlling pressure-motor the power which is naturally present in and inherent to the heating system, thus dispensing entirely with auxiliary air compressors or exhausting devices.

My invention is applied particularly to those systems of steam-heating in which a partial vacuum or lower pressure is maintained in the return-pipes by means of a pump or other suitable exhausting devices to draw out the air and water of condensation from the radiators and heaters, and I utilize this partial vacuum or lower pressure in the returns as the means for actuating the valve-controlling pressure-motor under thermostatic control.

In carrying out my invention I connect the pressure-motor chamber with the return-pipe by a branch having a thermostatically - controlled valve which operates to open communication through the branch and allow the suction or lower pressure to extend into the motor - chamber when the temperature of the apartment rises above the normal or the temperature at which the thermostat has been set to act. The motor-chamber is provided with an air-inlet wholly independent of the thermostatically-controlled valve in the branch suction or low-pressure pipe, through which air may pass at all times into the motor-chamber; but the area of this inlet is made so much smaller than the area of the suction-pipe that air will be exhausted faster than it can flow in when the thermostatically-controlled valve in the suction-pipe is open, and consequently the pressure-motor will at such times operate to close the valve or damper. When the thermostatically - controlled valve is closed, the suction on the motor-chamber ceases, and the air entering the small air-inlet permits the pressure-motor to return to normal position and open the controlling-valve.

In previous systems in which the use of suction has been suggested to operate the pressure-motor the suction-pipe has been provided with a thermostatically-controlled air-vent, which was closed at the predetermined temperature to seal the pipe and enable the suction to extend into the motor-chamber. Such devices are, however, objectionable and, so far as I am aware, have never been commercially adopted, because the air-vent into the suction-pipe is constantly open except at those intervals when the thermostat closes it, and if the suction-pipe were a branch of the return there would be such a loss of vacuum, particularly in a large plant having a great number of radiators, as would seriously affect the operation of suction in removing the air and water of condensation. This difficulty does not exist in my regulating devices, because the air-inlet to the pressure-motor is constantly open and is independent of the thermostat which controls the branch suction-pipe and communicates with the suction-pipe only at those intervals when the suction-controlling valve is open. The small loss of suction that may result in the return at such times is too insignificant to affect the removal of the air and water from the radiators.

My temperature-regulating devices may be applied to the control of either the steam-supply valve or the return-valve for the water of condensation, as is more fully set forth hereinafter.

Figure 7:
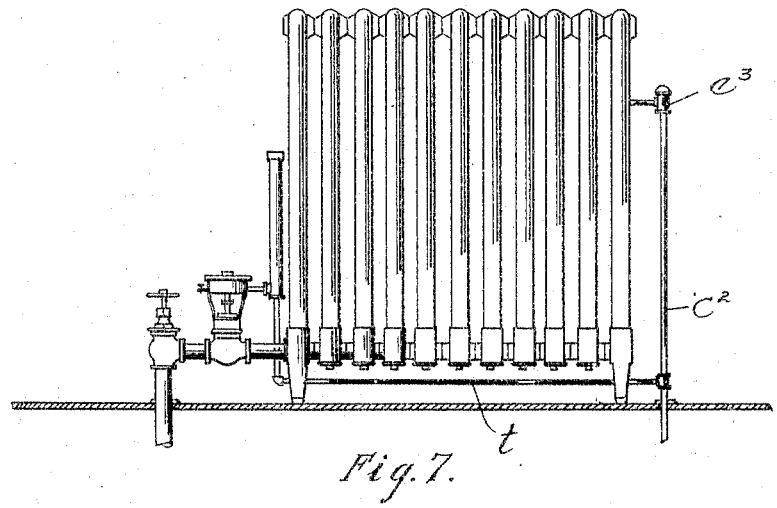

In the drawings, Figure 1 is a side elevation of a steam-radiator having my temperature-regulating devices applied to the supply-valve. Fig. 2 is a vertical sectional view of the supply-valve and a thermostatically-controlled electric valve for controlling it. Fig. 3 is a vertical sectional view of another form of thermostatically-controlled valve for controlling the supply-valve. Fig. 4 is a side elevation of a steam-radiator having a modified form of my temperature-regulating devices applied to it. Fig. 5 is a horizontal section on the line A A of Fig. 4. Fig. 6 is a side elevation of a radiator, showing the temperature-regulating devices applied to the return-valve. Fig. 7 shows the regulating devices applied to a one-pipe system having a suction-pipe leading from the air-valve.

Referring first to the control of the steam-supply, as shown in Figs. 1 to 5, $a$ is any suitable radiator, coil, or heater to which the steam is supplied from the usual supply-pipe $b$ and from which the air and water of condensation are returned by the usual return-pipe $c$, in which a partial vacuum or lower pressure is maintained by suitable exhausting devices. The usual hand-valve $d$ controls the steam-supply, and an automatic valve $e$ may be placed in the outlet to the return $c$ to control the escape of the air and water of condensation under the influence of the suction or lower pressure in the return. This system of steam heating is the well-known "Webster" system. Interposed in the supply connection $b'$ to the radiator is a valve $f$, controlled by any suitable pressure-motor $g$. In the drawings I have shown an ordinary valve-casing $h$ with the thoroughfare $i$ controlled by a valve-piece $j$, having its stem $k$ extending through a suitable stuffing-box in the bonnet $p$ and connected with a piston $m$ in a motor-chamber $n$, having a frame $o$ screwed upon the bonnet $p$. The upper part of the motor-casing above the piston is open to the atmosphere, and the lower part below the piston is provided with a small air-inlet $q$, which may be controlled by a small pin or screw $r$. $s$ is a spring acting on the piston $m$ and holding it normally elevated with the valve $f$ open. The particular construction of the valve $f$ and pressure-motor $g$ is, however, wholly immaterial to my invention, provided the motor be one which normally holds the valve $f$ open, and the motor-chamber is provided on the suction or low-pressure side with a small air-inlet $q$. $t$ is a branch pipe from the return-pipe $c$ to the lower or suction side of the motor-chamber, in which is located a thermostatically-controlled valve $u$ to open or close communication with the pressure-motor under thermostatic control. This thermostatically-controlled valve is so adjusted that while the temperature of the room is at or below normal or below the temperature at which the controlling-thermostat is set to act it will remain closed, so that communication between the branch suction or low-pressure pipe $t$ and the pressure-motor will be closed; but when the temperature rises above that point it will open to allow the suction to extend into the pressure-motor.

The cross-sectional area of the suction-pipe $t$ and its valve passage-way and inlet to the pressure-motor is greater than that of the air-inlet $q$, so that when the thermostatically-controlled valve $u$ is open the suction or lower pressure in the pipe $t$ will exhaust the air from the pressure-motor chamber faster than it can enter through the inlet $q$. Consequently as the upper side of the motor is acted upon by the atmosphere this suction or lower pressure will enable the atmospheric pressure to operate the motor against the action of the spring $s$ to close the valve $f$ and shut off the supply of steam, and the valve will remain closed until the normal temperature is restored and the thermostatically-controlled valve $u$ is operated to close the branch suction-pipe $t$. When this valve is closed and the suction of the air from the motor-chamber ceases, the air entering through the inlet $q$ will restore the atmospheric pressure and allow the spring $s$ to open the supply-valve $f$.

Any suitable valve may be used to control the branch suction-pipe $t$, and any of the well-known thermostatic devices may be used to operate that valve. For example, in Figs. 1 and 2 I have shown the well-known thermostatically-controlled electric valve, in which the valve $u$ is operated by a solenoid $a'$ through an electric circuit closed by a bimetallic thermostat $c'$. In Fig. 3 I have shown a direct-acting thermostat consisting of two pieces $d'$ $e'$, composed of materials of different coefficients of expansion connected together at their outer ends and secured, respectively, at their other ends to the valve-piece and valve-casing. Such devices are well known and require no detailed description. In Figs. 4 and 5 I have shown the preferred arrangement of a direct-acting thermostat of the character shown in Fig. 3—to wit, horizontally below the base of the radiator, as the temperature at that point is approximately the average room temperature—and the thermostat when placed in this position is practically concealed from view. The direct-acting thermostatic device may, however, be applied adjacent to the pressure-motor, as shown in Fig. 7, which illustrates the temperature-regulating devices applied to a one-pipe system having a suction return-pipe $c^3$, leading from the air-valve $e^3$, from which the branch suction-pipe $t$ leads to the motor-chamber of the fluid-pressure motor, as in arrangements shown in Figs. 1, 4, and 5.

It will be noted that the regulating supply-valve $f$ is normally open and that the radiator may be at all times under ordinary hand control through the valve $d$. The steam may be turned on or off in the usual manner, and if for any reason the thermostat is out of order that will not affect the ordinary circulation through the radiator or lower the suction in the return-pipe. The temperature-regulating devices may also be applied to the return-valve to close the outlet from the radiator or heater when the temperature of the room reaches the degree at which the thermostat is set to operate. In such cases the steam-supply is connected with the heater at the top, and in the case of a radiator the sections are connected at the top like an ordinary hot-water radiator. The closing of the return-valve then acts to prevent the escape of condensation and "water-logs" the radiator or heater to a greater or less extent until the temperature of the room is reduced to the normal. This construction is illustrated in Fig. 6, in which the supply-pipe $b$, controlled by any suitable valve $d$, supplies the heater or radiator $a$ at the top. The return-valve $e^2$ in this case is controlled by a pressure-motor $g'$, having the suction-chamber connected by the branch suction-pipe $t$ with the return $c$, in which is located the thermostatically-controlled valve $u'$, the suction-chamber of the pressure-motor being provided with the same restricted air-inlet $q'$. The operation of the thermostatic controlling devices in this case is exactly the same as has been described; but they operate the return-valve instead of the supply-valve and control the effective temperature of the radiator by water-logging it instead of by shutting off the steam-supply. In Fig. 6 I have shown for purposes of illustration the thermostatically-controlled electric valve for opening and closing the branch suction-pipe; but it is obvious that any of the thermostatically-controlled valve devices suitable to the control of the supply-valve may be used in connection with the return-valve.

What I claim as new, and desire to secure by Letters Patent, is as follows:

1. In a temperature-controlling apparatus for steam-heating systems, the combination of a radiator having a return-pipe, in which a partial vacuum or lower pressure is maintained, a supply-valve to control the supply of steam to the radiator, a fluid-pressure motor operatively connected with said supply-valve to control the same, a branch suction-pipe leading from the return to the motor-chamber of said fluid-pressure motor, a valve in said branch suction-pipe, and a thermostatic device to operate said valve in the branch suction-pipe, said fluid-pressure motor being provided with an open air-inlet into the motor-chamber independent of the valve in the branch suction-pipe and of the thermostatic device which controls it, and having a relatively smaller opening than the thoroughfare through said branch suction-pipe.

2. In a temperature-controlling apparatus for steam-heating systems, the combination of a radiator having a return-pipe, in which a partial vacuum or lower pressure is maintained, a hand-valve to positively control the supply of steam to the radiator, a normally open automatic supply-valve between the hand-valve and radiator, a fluid-motor operatively connected with said automatic supply-valve, a branch suction-pipe leading from the return to the motor-chamber of the fluid-pressure motor, a valve in said branch suction-pipe, and a thermostatic device to operate said valve in the branch suction-pipe, said fluid-pressure motor being provided with an open air-inlet into the motor-chamber independent of the valve in the branch suction-pipe and of the thermostatic device which controls it, and having a relatively smaller opening than the thoroughfare through said branch suction-pipe.

3. In a temperature-controlling apparatus for steam-heating systems, the combination of a controlling-valve connected with the radiator or heater, a fluid-pressure motor operatively connected with said valve and maintaining it normally open, a pipe connected with said radiator or heater, in which a partial vacuum or lower pressure is maintained, having a branch leading to the motor-chamber of said fluid-pressure motor, and a thermostatically-controlled valve in said branch, said fluid-pressure motor being provided with an open air-inlet into the motor-chamber independent of the thermostatically-controlled valve in the branch and having a relatively smaller opening than the thoroughfare through said branch.

In testimony of which invention I have hereunto set my hand.

ERNEST HOWARD HUNTER.

Witnesses:
R. M. KELLY,
M. J. EYRE.